US009146918B2

(12) United States Patent
Ashparie et al.

(10) Patent No.: US 9,146,918 B2
(45) Date of Patent: Sep. 29, 2015

(54) COMPRESSING DATA FOR NATURAL LANGUAGE PROCESSING

(71) Applicant: International Business Machines Corporation, Armonk, NY (US)

(72) Inventors: Yousuf Mohamed Ashparie, Centerville, VA (US); Aaron Keith Baughman, Silver Spring, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 14/026,240

(22) Filed: Sep. 13, 2013

(65) Prior Publication Data

US 2015/0081275 A1   Mar. 19, 2015

(51) Int. Cl.
*G06F 17/30* (2006.01)
*G06F 7/00* (2006.01)
*G06F 17/28* (2006.01)

(52) U.S. Cl.
CPC ...... *G06F 17/2818* (2013.01); *G06F 17/30705* (2013.01); *G06F 17/30731* (2013.01); *G06F 17/30796* (2013.01)

(58) Field of Classification Search
USPC ........................................................ 707/771
See application file for complete search history.

(56) References Cited

U.S. PATENT DOCUMENTS

| | | | |
|---|---|---|---|
| 6,658,151 B2 | 12/2003 | Lee et al. | |
| 7,657,507 B2 | 2/2010 | Shi et al. | |
| 7,999,704 B2 | 8/2011 | Fitzek et al. | |
| 8,073,838 B2 | 12/2011 | Shi et al. | |
| 8,626,801 B2 * | 1/2014 | Probst et al. | 707/803 |
| 8,892,550 B2 * | 11/2014 | Chu-Carroll et al. | 707/728 |
| 2004/0010483 A1 * | 1/2004 | Brands et al. | 706/45 |
| 2010/0169441 A1 | 7/2010 | Lafleur et al. | |
| 2011/0138312 A1 | 6/2011 | Yeh et al. | |
| 2012/0084076 A1 | 4/2012 | Boguraev et al. | |

(Continued)

FOREIGN PATENT DOCUMENTS

| | | |
|---|---|---|
| EP | 2045739 A2 | 8/2009 |
| WO | 2007055986 A3 | 9/2008 |
| WO | 2012050800 A1 | 4/2012 |

OTHER PUBLICATIONS

Siemans et al; Technology of Ontology Clustering of Effective Reasoning Procedures, Jun. 10, 2010.

(Continued)

*Primary Examiner* — Kuen Lu
(74) *Attorney, Agent, or Firm* — Garg Law Firm, PLLC; Rakesh Garg; Matthew Chung

(57) ABSTRACT

Data pertaining to a subject matter domain, a set of text strings forming a set of seeds, a description of a linguistic structure present in a language of the domain-related data, and a statistical model applicable to the domain-related data are received. A set of portions of the domain-related data is extracted, a portion in the set of portions forming a nugget. A nugget matches the statistical model according to a criterion, and conforms to the linguistic structure within a threshold degree. The nugget is scored according to a subset of a set of features found in the nuggets. A subset of nuggets is selected. A score of each nugget included in the subset of nuggets exceeds a score threshold. The subset of nuggets is combined to form a pseudo-document. The pseudo-document is submitted to an application for answering a question related to the domain.

20 Claims, 7 Drawing Sheets

(56) References Cited

U.S. PATENT DOCUMENTS

| | | | |
|---|---|---|---|
| 2012/0130995 A1 | 5/2012 | Risvik et al. | |
| 2012/0296637 A1 | 11/2012 | Smiley et al. | |
| 2013/0103625 A1 | 4/2013 | Tateno et al. | |
| 2013/0212092 A1 | 8/2013 | Dean et al. | |

OTHER PUBLICATIONS

Anonymous, System and Method for Using Hypernym Trees to Enable Concept and Topic Based Searches, Dec. 18, 2012.

Pipitone et al; Cognitive Linguistics as the Underlying Framework for Semantic Annotation, 2012.

Caverlee et al; Distributed Query Sampling: A Quality-Conscious Approach, Aug. 6-10, 2006, Seattle, Washington, USA.

Chowdhury et al; Logarithmic Formula Generated Seed Based Cryptographic Technique Using Proposed Alphanumeric Number System and Rubik Rotation Algorithm, 2012.

Gao et al; Corpus Expansion for Statistical Machine Translation with Semantic Role Label Substitution Rules, Proceedings of the 49th Annual Meeting of the Association for Computational Linguistics: shortpapers, pp. 294-298, Portland, Oregon, Jun. 19-24, 2011.

Gey et al; The Crucial Role of Semantic Discovery and Markup in Geo-temporal Search, ESAIR'10, Oct. 30, 2010, Toronto, Ontario, Canada.

Gharechophogh et al; Analysis and Evaluation of Unstructured Data: Text Mining versus Natural Language, 2011.

Li et al; Scalable Community Discovery on Textual Data with Relations, CIKM'08, Oct. 26-30, 2008, Napa Valley, California, USA.

Park et al; Anaphora Resolution System for Natural Language Requirements Document in Korean, 2010 Third International Conference on Information and Computing, 2010.

Rao et al; Affinity Measures based on the Graph Laplacian, Coling 2008: Proceedings of 3rd Textgraphs workshop on Graph-Based Algorithms in Natural Language Processing, pp. 41-48, Manchester, Aug. 2008.

Schlaefer, Statistical Source Expansion for Question Answering, 2009-2011.

Tianqiang et al; A robust video text extraction method based on text traversing line and stroke connectivity, 2008.

Liu et al; Using WordNet to Disambiguate Word Senses for Text Classification, ICCS 2007, Part III, LNCS 4489, pp. 780-788, 2007. Springer-Verlag Berlin Heidelberg 2007.

Yuan et al; Natural Language Processing Based Ontology Learning, 2010 International Conference on Computer Application and System Modeling (ICCASM 2010), 2010.

Joaqu' in Adiego, et al., "A Two-Level Structure for Compressing Aligned Bitexts", Spanish projects TIN2006-15071-C03-01.

\* cited by examiner

COMPRESSING DATA FOR NATURAL LANGUAGE PROCESSING

GOVERNMENT RIGHTS

This invention was made with Government support. The GOVERNMENT HAS CERTAIN RIGHTS IN THIS INVENTION.

TECHNICAL FIELD

The present invention relates generally to a method, system, and computer program product for improving natural language processing. More particularly, the present invention relates to a method, system, and computer program product for compressing data for natural language processing.

BACKGROUND

Natural language processing (NLP) is a technique that facilitates exchange of information between humans and data processing systems. For example, one branch of NLP pertains to answering questions about a subject matter based on information available about the subject matter domain.

Information about a domain can take many forms and can be sourced from any number of data sources. The presenter of the information generally selects the form and content of the information. Before information can be used for NLP, generally, the information has to be transformed into a form that is usable by an NLP engine.

SUMMARY

The illustrative embodiments provide a method, system, and computer program product for compressing data for natural language processing. An embodiment retrieves data pertaining to a subject matter domain, forming the domain-related data. The embodiment receives, forming a set of seeds, a set of text strings, wherein a text string forms a seed, and wherein the seed is derived from a domain topology. The embodiment receives a description of a linguistic structure present in a language of the domain-related data. The embodiment receives a statistical model applicable to the domain-related data. The embodiment extracts, using a processor and a memory, a set of portions of the domain-related data, a portion in the set of portions forming a nugget, and the set of portions forming a set of nuggets, wherein a nugget matches the statistical model according to a criterion, and wherein the nugget conforms to the linguistic structure within a threshold degree. The embodiment scores a nugget in the set of nuggets according to a subset of a set of features found in the nuggets. The embodiment selects a subset of nuggets, the subset including the scored nugget, wherein a score of each nugget included in the subset of nuggets exceeds a score threshold. The embodiment combines the subset of nuggets to form a pseudo-document. The embodiment submits the pseudo-document to an application for answering a question related to the domain.

Another embodiment includes one or more computer-readable tangible storage devices. The embodiment further includes program instructions, stored on at least one of the one or more storage devices, to retrieve data pertaining to a subject matter domain, forming the domain-related data. The embodiment further includes program instructions, stored on at least one of the one or more storage devices, to receive, forming a set of seeds, a set of text strings, wherein a text string forms a seed, and wherein the seed is derived from a domain topology. The embodiment further includes program instructions, stored on at least one of the one or more storage devices, to receive a description of a linguistic structure present in a language of the domain-related data. The embodiment further includes program instructions, stored on at least one of the one or more storage devices, to receive a statistical model applicable to the domain-related data. The embodiment further includes program instructions, stored on at least one of the one or more storage devices, to extract, using a processor and a memory, a set of portions of the domain-related data, a portion in the set of portions forming a nugget, and the set of portions forming a set of nuggets, wherein a nugget matches the statistical model according to a criterion, and wherein the nugget conforms to the linguistic structure within a threshold degree. The embodiment further includes program instructions, stored on at least one of the one or more storage devices, to score a nugget in the set of nuggets according to a subset of a set of features found in the nuggets. The embodiment further includes program instructions, stored on at least one of the one or more storage devices, to select a subset of nuggets, the subset including the scored nugget, wherein a score of each nugget included in the subset of nuggets exceeds a score threshold. The embodiment further includes program instructions, stored on at least one of the one or more storage devices, to combine the subset of nuggets to form a pseudo-document. The embodiment further includes program instructions, stored on at least one of the one or more storage devices, to submit the pseudo-document to an application for answering a question related to the domain.

Another embodiment includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to retrieve data pertaining to a subject matter domain, forming the domain-related data. The embodiment further includes program instructions, stored on at least one of the one or more storage devices for execution by at least one of the one or more processors via at least one of the one or more memories, to receive, forming a set of seeds, a set of text strings, wherein a text string forms a seed, and wherein the seed is derived from a domain topology. The embodiment further includes program instructions, stored on at least one of the one or more storage devices for execution by at least one of the one or more processors via at least one of the one or more memories, to receive a description of a linguistic structure present in a language of the domain-related data. The embodiment further includes program instructions, stored on at least one of the one or more storage devices for execution by at least one of the one or more processors via at least one of the one or more memories, to receive a statistical model applicable to the domain-related data. The embodiment further includes program instructions, stored on at least one of the one or more storage devices for execution by at least one of the one or more processors via at least one of the one or more memories, to extract, using a processor and a memory, a set of portions of the domain-related data, a portion in the set of portions forming a nugget, and the set of portions forming a set of nuggets, wherein a nugget matches the statistical model according to a criterion, and wherein the nugget conforms to the linguistic structure within a threshold degree. The embodiment further includes program instructions, stored on at least one of the one or more storage devices for execution by at least one of the one or more processors via at least one of the one or more memories, to score a nugget in the set of nuggets according to a subset of a set of features found in the nuggets. The embodiment further includes program instructions, stored on at least one of the one or more storage devices for execution by at least one of the one or more processors via at least one of the one or more memories, to select a subset of nuggets, the subset including the scored nugget, wherein a score of each nugget included in the subset of nuggets exceeds a score threshold. The embodiment further includes program instructions, stored on at least one of the one or more storage devices for execution by at least one of the one or more processors via at least one of the one or more memories, to combine the subset of nuggets to form a pseudo-document. The embodiment further includes program instructions, stored on at least one of the one or more storage devices for execution by at least one of the one or more processors via at least one of the one or more memories, to submit the pseudo-document to an application for answering a question related to the domain.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
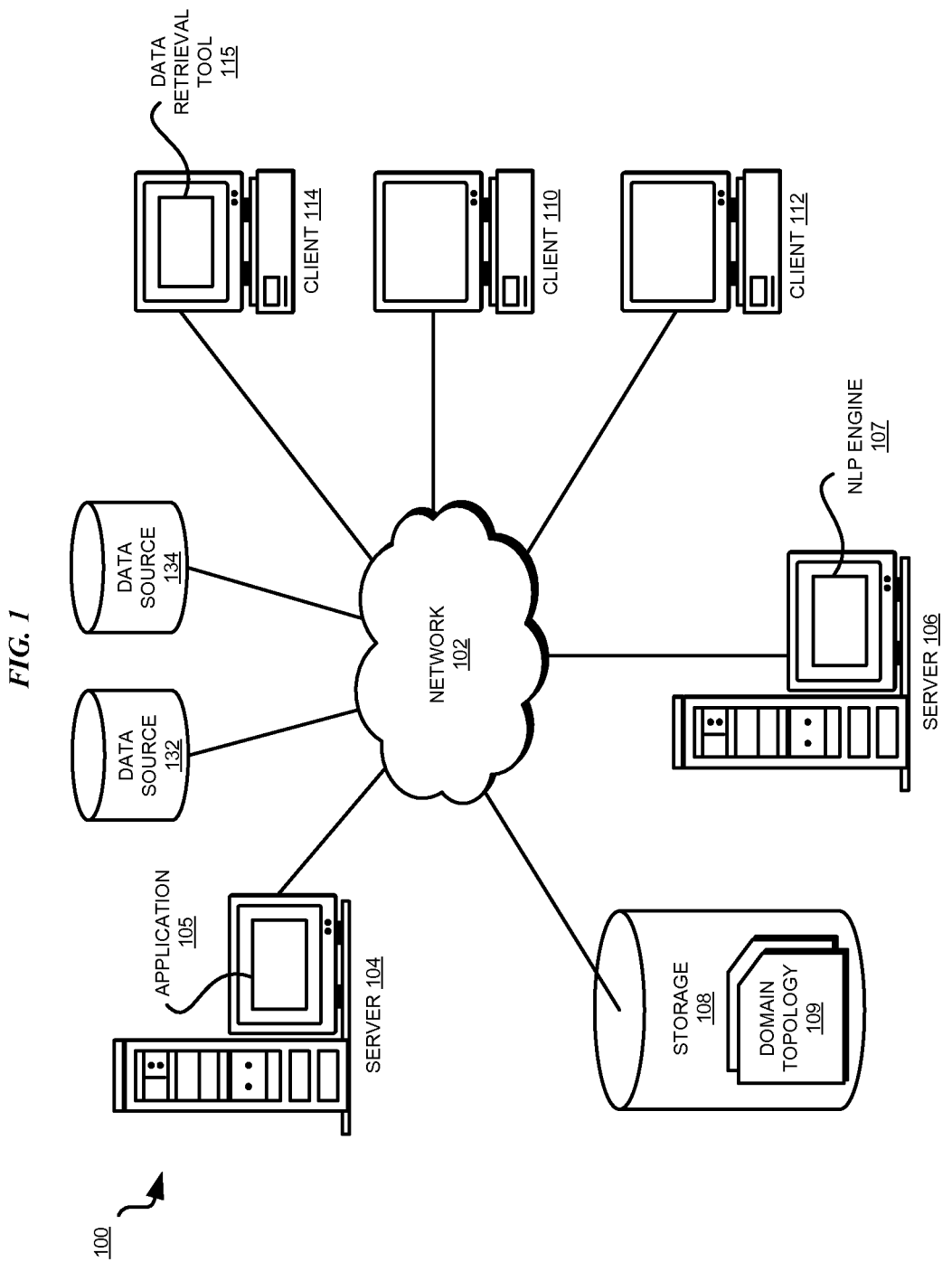
FIG. 1 depicts a block diagram of a network of data processing systems in which illustrative embodiments may be implemented.

A corpus (plural: corpora) is data, or a collection of data, used in linguistics and language processing. A corpus generally comprises large volume of data, usually text, stored electronically.

The illustrative embodiments recognize that a data, as originally provided by a data source, is rarely fit for direct consumption by an NLP engine. For example, data received from a source may include acronyms, which may have to be expanded for recognition and consumption in NLP. As another example, words in a document may have to be augmented with the word's synonyms and homonyms, perhaps even antonyms, to produce a transformed document that is usable in NLP. Some other processing of data may be needed to eliminate or reduce the possibilities of failures or errors from a data source. Other processing of data may include manipulating the data for candidate answer generation, and other NLP objectives.

The illustrative embodiments recognize that transforming data to form a corpus or corpora for consumption in an NLP engine often increases the size of the original data. The augmenting, substituting, expanding, duplicating, or otherwise manipulating of data can result in a corpus that is many times the size of the original data, for example, in one case, up to twelve times the size of the original data of a source.

The illustrative embodiments further recognize that the expanded size of the corpus that results from such transformations is problematic. For example, the corpus occupies large storage volumes, slows the processing or consumption of the corpus, and adversely affects standard data retrieval metrics such as the precision, accuracy, and recall.

The illustrative embodiments used to describe the invention generally address and solve the above-described problems and other problems related to the expanded data—corpus, resulting from pre-processing of data for consumption in natural language processing. The illustrative embodiments provide a method, system, and computer program product for compressing data for natural language processing.

A corpus pertains to a subject matter domain. For example, if an objective of a particular NLP operation were to answer questions related to golf, information collected from various sources would have to be pre-processed to form one or more corpus pertaining to the subject matter domain of golf.

An embodiment creates a statistical model of a given subject matter domain, such as by using test data including labeled data and a test corpora. For example, the embodiment determines a level of semantic redundancy and a level of lexical redundancy in a given corpus. Semantic redundancy occurs when the same word or phrase appears again with a different meaning, implication, or context in the corpus as compared to a previous occurrence. Lexical redundancy occurs when the same word is repeated with the same meaning, implication, or context as a previous occurrence.

An embodiment also creates or obtains a linguistic model for the language and grammar of the corpus. For example, a specification in a linguistic model of an example corpus may regard a sentence, or a portion of a sentence up to a particular punctuation, as a linguistic structure sufficient to impart a definitive meaning to the sentence or the portion. Another specification in the linguistic model may regard a plurality of sentences, such as in a paragraph, as another linguistic structure, for example, when the context or meaning of the contents of a sentence is established by another prior sentence.

A linguistic model for a given domain further includes a representation, such as a histogram, of word frequencies. The words in the representation are selected from the given domain according to their relevance to the domain, such as by their occurrence, importance, or likelihood of appearance in domain-related literature.

An embodiment further constructs a domain topology. Ontology is an example of a domain topology. As an example, a domain topology according to an embodiment includes one or more hierarchical tree data structures, each having a root node and several other nodes in parent-child relationships. For example, a hierarchy can start at a the root node of the tree or a subtree. The nodes at the next level in the hierarchy from the root node are children nodes of the root node in that tree or subtree. The hierarchy can continue to any number of levels in a similar fashion. Some example occupants of the nodes in such tree representations according to an embodiment include but are not limited to words, keywords, phrases, numbers, alphanumeric strings, symbols, icons, speech patterns, and images are.

A seed is a collection of nodes in a tree in a domain topology. For example, an example seed according to an example embodiment includes all words and phrases corresponding to a root node and another node, including all intervening nodes in the tree. Another example seed according to an example embodiment includes the words and phrases corresponding to a combination of one or more nodes in the tree. Generally, a seed according to an embodiment is derived from a domain topology such that the seed is usable for retrieving, receiving, or selecting data from one or more data sources such that the data is relevant to the subject matter domain.

Seeds can be specific or generic. For example, in one embodiment, specific seeds are found towards the bottom of the tree and general or generic seeds are found towards the top of the tree.

Using the statistical model, the linguistic model, the domain topology, and one or more corpus, an embodiment produces pseudo-documents. A pseudo-document (PD) is a document not directly received from any data source, but formed using information extracted from the corpus according to an embodiment.

Optionally, an embodiment further summarizes a pseudo-document and assigns a title to the pseudo-document according to the summary. In one embodiment, the summary forms the title of the pseudo-document.

An embodiment submits a set of pseudo-documents to an NLP engine for use in NLP. Advantageously, the size of the set of pseudo-documents is smaller than the size of the corpus, without losing the domain-specific information there from, thereby achieving compaction of the corpus. Advantageously, the set of pseudo-documents produced by an embodiment further improve precision, accuracy, and recall in NLP processing, as compared to NLP using the expanded data of the corpus.

The illustrative embodiments are described with respect to certain data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
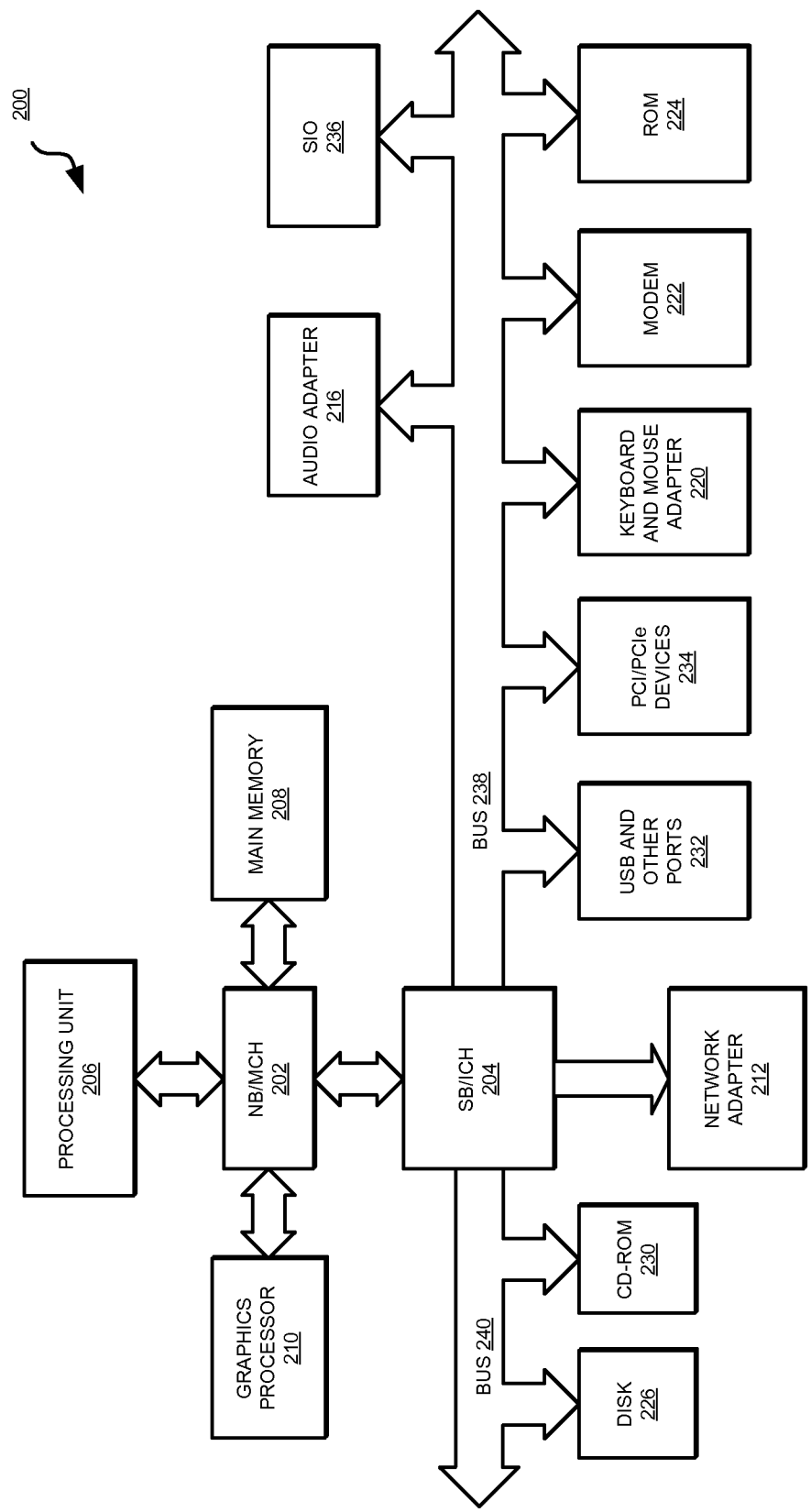
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. For example, Application 105 in server 104 implements an embodiment for compressing data for natural language processing described herein. NLP engine 107 in server 106 implements a combination of tools and techniques to be used within or in conjunction with application 105 for NLP as described herein. Domain topology 109 in storage 108 includes one or more tree structures as described herein. Data retrieval tool 115 in client 114 retrieves data from one or more data sources, such as data sources 132 and 134 over network 102. In one embodiment, data source 132 is local, for example, accessible over a bus or a local area network, and data source 134 is external, for example, accessible over a wide area network.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, NLP engine 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
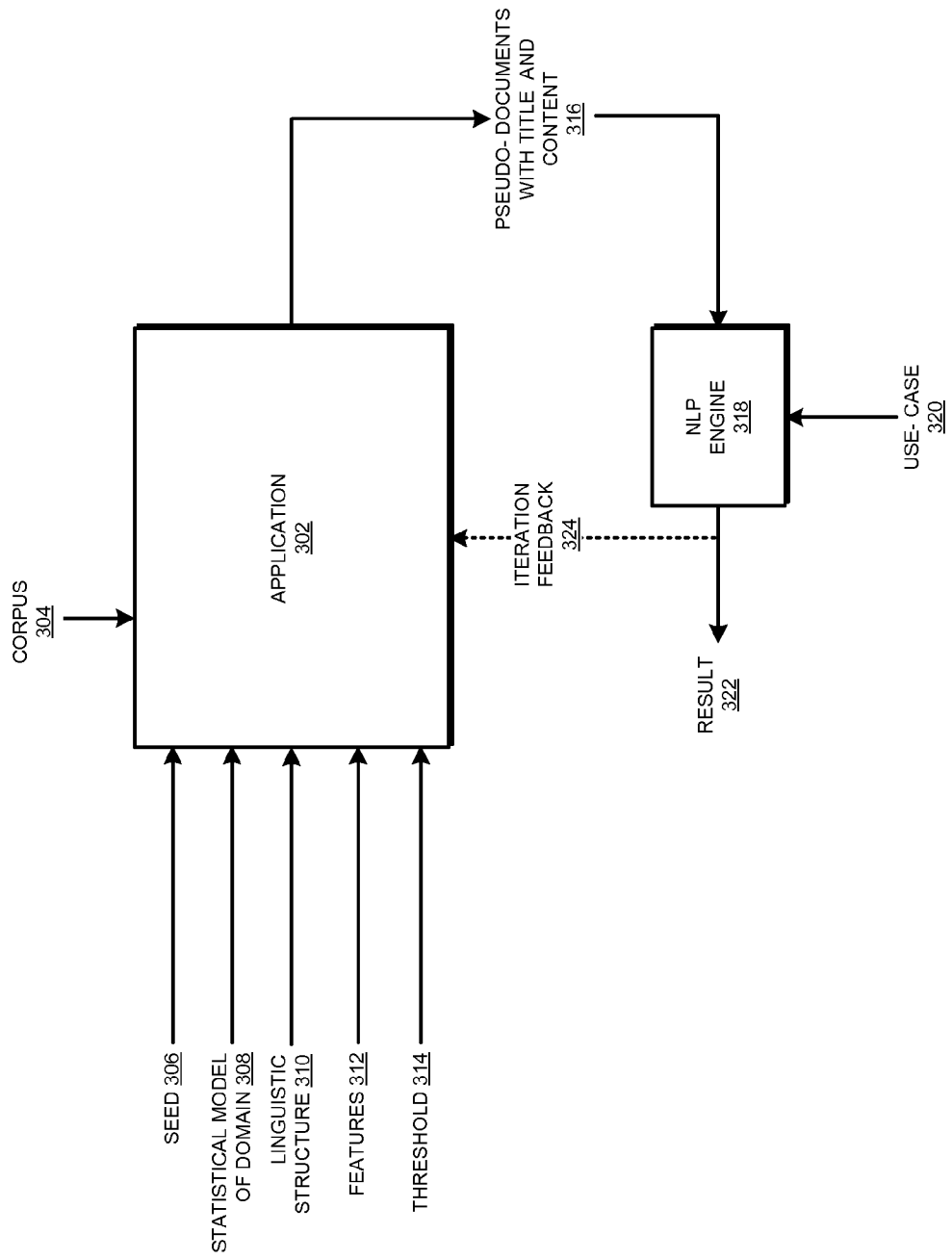
FIG. 3 depicts a block diagram of a process of compressing data for natural language processing in accordance with an illustrative embodiment.

With reference to FIG. 3, this figure depicts a block diagram of a process of compressing data for natural language processing in accordance with an illustrative embodiment. Application 302 is an example of application 105 in FIG. 1.

Application 302 receives corpus 304, where corpus 304 pertains to a subject matter domain. Application 302 further receives one or more seed 306, which is derived from a domain topology of the domain of corpus 304 as described earlier. Application 302 also receives, or has access to statistical model 308 and linguistic model 310 of corpus 304.

A portion of data in corpus 304, that matches with statistical model 308 according to a criterion, conforms to linguistic model 310, and includes all or part of seed 306 is called a nugget. For example, in one embodiment, an example portion of corpus 304 includes text, such as a word or phrase, which occurs at a frequency consistent with a frequency corresponding to the text in statistical model 308. Furthermore, the example portion of corpus 304 obeys a linguistic structure specified in linguistic model 310. In addition, the example portion of corpus 304 includes at least a portion of seed 306. When these conditions are met, the example portion of corpus 304 is selected as an example nugget.

The conditions of frequency of occurrence, the linguistic structure, and a portion of seed are only described as examples for the clarity of the description. An implementation can include additional or different conditions without departing the scope of the illustrative embodiments. For example, a distance between repetitive occurrences can be used in place of or in conjunction with the frequency for matching with statistical model 308. As another example, conformity with more than one, or partial linguistic structures may be sufficient for complying with linguistic model 310.

Furthermore, corpus 304 can include any number of such nuggets without limitation. A nugget may overlap with another nugget within the scope of the illustrative embodiments.

An embodiment scores a nugget according to the features found in the nugget. Application 302 receives a set of one or more features 312 as input. A feature is an aspect of interest in the domain of corpus 304.

For example, if the domain of corpus were golf, an aspect of interest in the golfing domain would be the tournaments. One of features 312 could be "tournament" or "championship." If more than one feature 312 were provided, another example feature could be a name of a specific tournament.

If a nugget included information pertaining to a tournament, application 302 would assign a higher score to that nugget as compared to a nugget that pertained to a golf athlete but included nothing about a tournament. Specifying such a feature would help elevate those nuggets from the set of nuggets found, which include information about golfing tournaments.

Any number and type of features can similarly be used to extract from the nuggets and to generate the scores for the nuggets. Eventually, a nugget has a cumulative score, which represents an overall ranking of a nugget within the set of nuggets. Thus, generally, a feature in features 312 is a way of specifying an area of interest within the domain of corpus 304, such as a scope of questions to be asked against corpus 304.

Threshold 314 can be one or more thresholds. One example threshold in a plurality of thresholds 314 can be a cut-off score, where application 302 selects for later processing only those nuggets whose cumulative scores exceeded the cut-off score. Another example threshold in thresholds 314 can be a degree of match with statistical model 308 to form a nugget. Another example threshold in thresholds 314 can be a degree of conformity with linguistic model 310 to form a nugget. Another example threshold in thresholds 314 can be a minimum portion of seed 306 to be used to find relevant data from the data sources. Many other thresholds will be conceivable from this disclosure for those of ordinary skill in the art and the same are contemplated within the scope of the illustrative embodiments.

Application 302 merges scored and selected nuggets into one or more pseudo-documents 316. For example, in one embodiment, application 302 produces one pseudo-document per seed 306 and including a plurality of features 312. In another example, another example embodiment produces one pseudo-document per seed 306 per feature 312. Nuggets can be merged in any suitable manner to form one or more pseudo-documents 316.

A pseudo-document in pseudo-documents 316 includes a title and content. One embodiment creates a title for a pseudo-document in pseudo-documents 316 by summarizing the merged nuggets using any suitable technique, and assigns the summary as the title of the pseudo-document.

NLP engine 318 is an example of NLP engine 107 in FIG. 1. Pseudo-documents 316 form an input to NLP engine 318. Advantageously, pseudo-documents 316 are compact compared to corpus 304 and concentrate the domain specific information from corpus 304 in a comparatively smaller volume.

NLP engine 318 receives use case 320 to run as an iteration. NLP engine 318 processes use case 320 and outputs results 322. For example, in one embodiment, use case 320 may be a battery of questions in the domain of corpus 304. Results 322 accordingly are answers to those questions. The answers may be right or wrong according to a threshold level of correctness, precision, accuracy, repeatability, or a combination thereof.

In one embodiment, application 302 receives results 322 or a version thereof as feedback 324. For example, in one embodiment, results 322 are analyzed to determine an area of domain where higher than a threshold number of questions received a wrong answer.

Application 302 uses feedback 324 to tune the compaction process. For example, in one embodiment, application 302 includes the missed area of the domain as a feature for another iteration of nugget creation so that more nuggets in that area are created, improving the answers to the questions pertaining to that particular area of the domain.

In another embodiment, application 302 determines that results 322 indicate overly tightly defined information in certain areas such that questions directly in that area are answered correctly bit questions indirectly relating to that area are receiving wrong answers. Application 302 uses a lower threshold of statistical model conformity, lower threshold of portions of seed to be found, more alternative features to be added, or a combination of these and other adjustments in the next iteration of nugget creation.

Operating in this manner of machine learning, application 302 can iteratively improve the quality of pseudo-documents 316 such that results 322 reach a desired level of acceptability.

Figure 4:
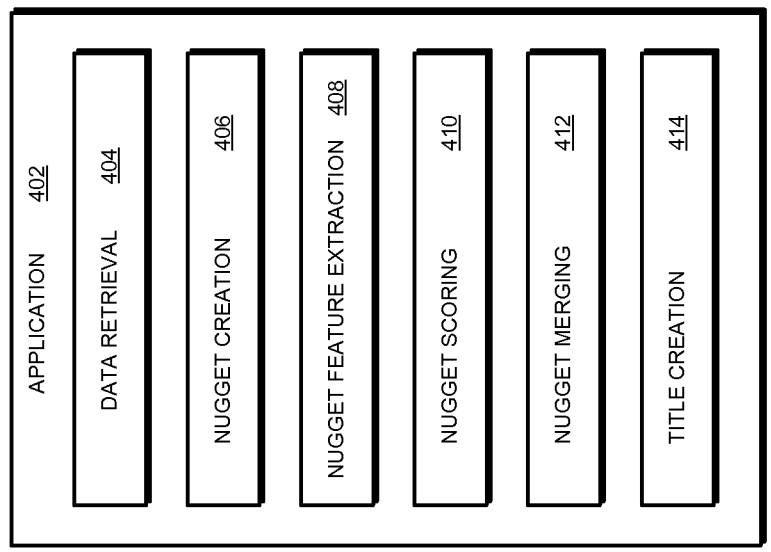
FIG. 4 depicts a block diagram of an example configuration of an application for compressing data for natural language processing in accordance with an illustrative embodiment.

With reference to FIG. 4, this figure depicts a block diagram of an example configuration of an application for compressing data for natural language processing in accordance with an illustrative embodiment. Application 402 is an example embodiment of application 302 in FIG. 3.

Application 402 includes data retrieval component 404. For example, using all or part of a provided seed in conjunction with data retrieval tool 115 in FIG. 1, component 404 retrieves data from one or more data sources. As an example, a data retrieval tool can be a web search engine, a query engine of a database, or any other data retrieval tool given a particular type of data source.

Furthermore, component 404 can retrieve data from any number of data sources, whether internal, external, or both. Component 404 also performs, or causes to be performed, transformation of the retrieved data into a corpus usable for NLP, such as corpus 304 in FIG. 3.

Application 402 includes nugget creation component 406. In the manner described with respect to FIG. 3, component 406 creates nuggets from the corpus formed from data retrieved by component 404.

Application 402 includes feature extraction component 408. Feature extraction component 408 identifies whether a nugget includes one or more specified features, such as a feature in features 312 in FIG. 3. Component 408 can also extract the identified features, such as for supplying to component 410 for scoring the nugget.

Component 410 performs nugget scoring using the features extracted from the nuggets. Component 412 merges those scored nuggets whose scores exceed a cutoff threshold into one or more pseudo-documents, such as pseudo-documents 316. Title creation component 414 summarizes a pseudo-document to create a title for the pseudo-document and assign the title to the pseudo-document.

Figure 5:
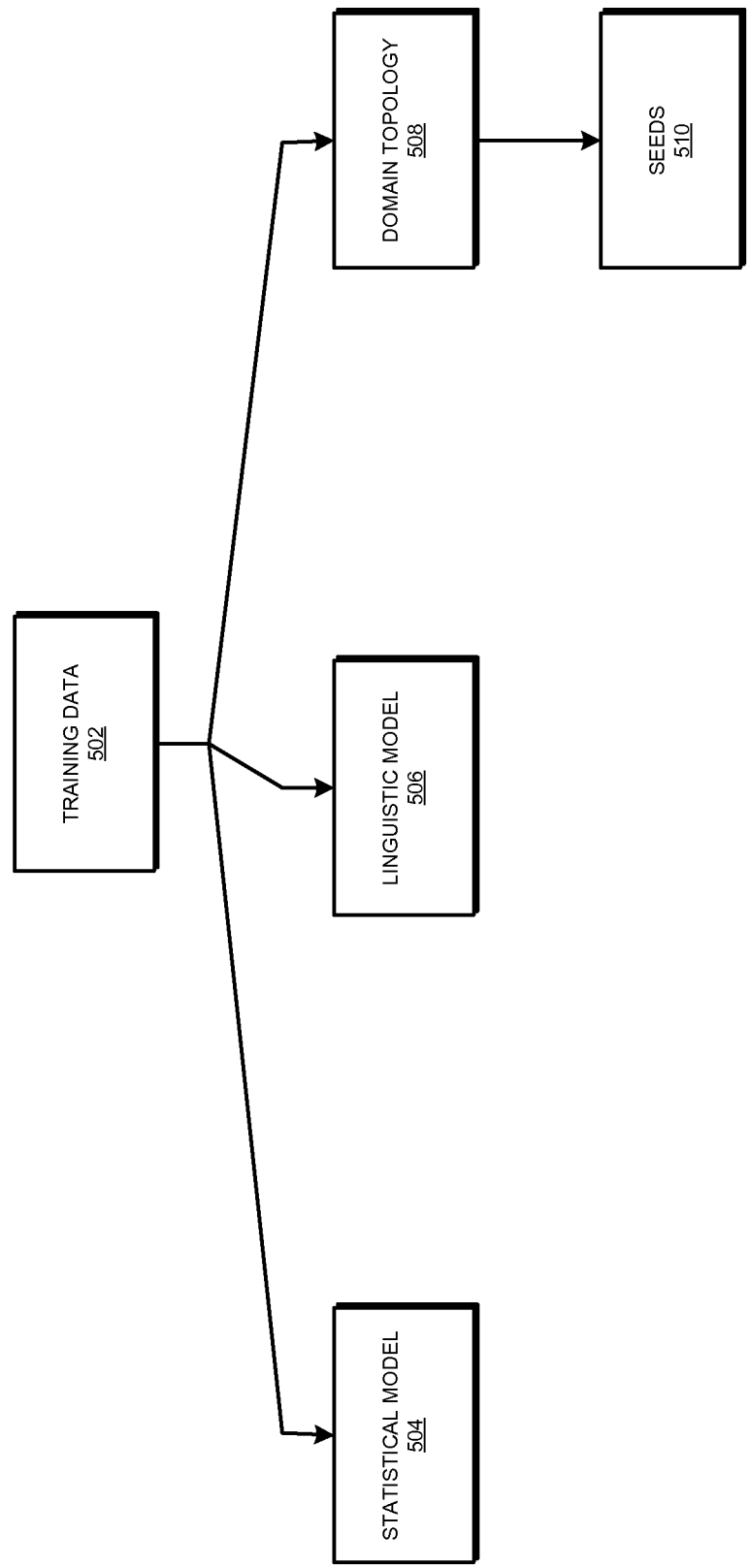
FIG. 5 depicts an example configuration of training data usable for training an application for compressing data for natural language processing in accordance with an illustrative embodiment.

With reference to FIG. 5, this figure depicts an example configuration of training data usable for training an application for compressing data for natural language processing in accordance with an illustrative embodiment. Training data 502 may be used as corpus 304 to train application 302 in FIG. 3.

Training data 502 is training data about a domain that is marked with nuggets indicators, feature indicators, and other indicators to train application 302 to perform the nugget creation, feature detection and extraction, scoring, merging, and summarizing tasks. Statistical model 504, linguistic model 506, and domain topology 508 are created for training data 502. Application 302, in training mode, receives training data 502 as corpus 304, and statistical model 504 and linguistic model 506 as inputs. Seeds 510 are defined based on domain topology 508, and provided to application 302 as input.

Training data 502 is annotated to guide application 302 to the embedded training nuggets. In one embodiment, a user annotates training data 502. The annotations can generally include additional or different annotations to train application 302 for performing the operations described with respect to FIGS. 3 and 4.

Figure 6:
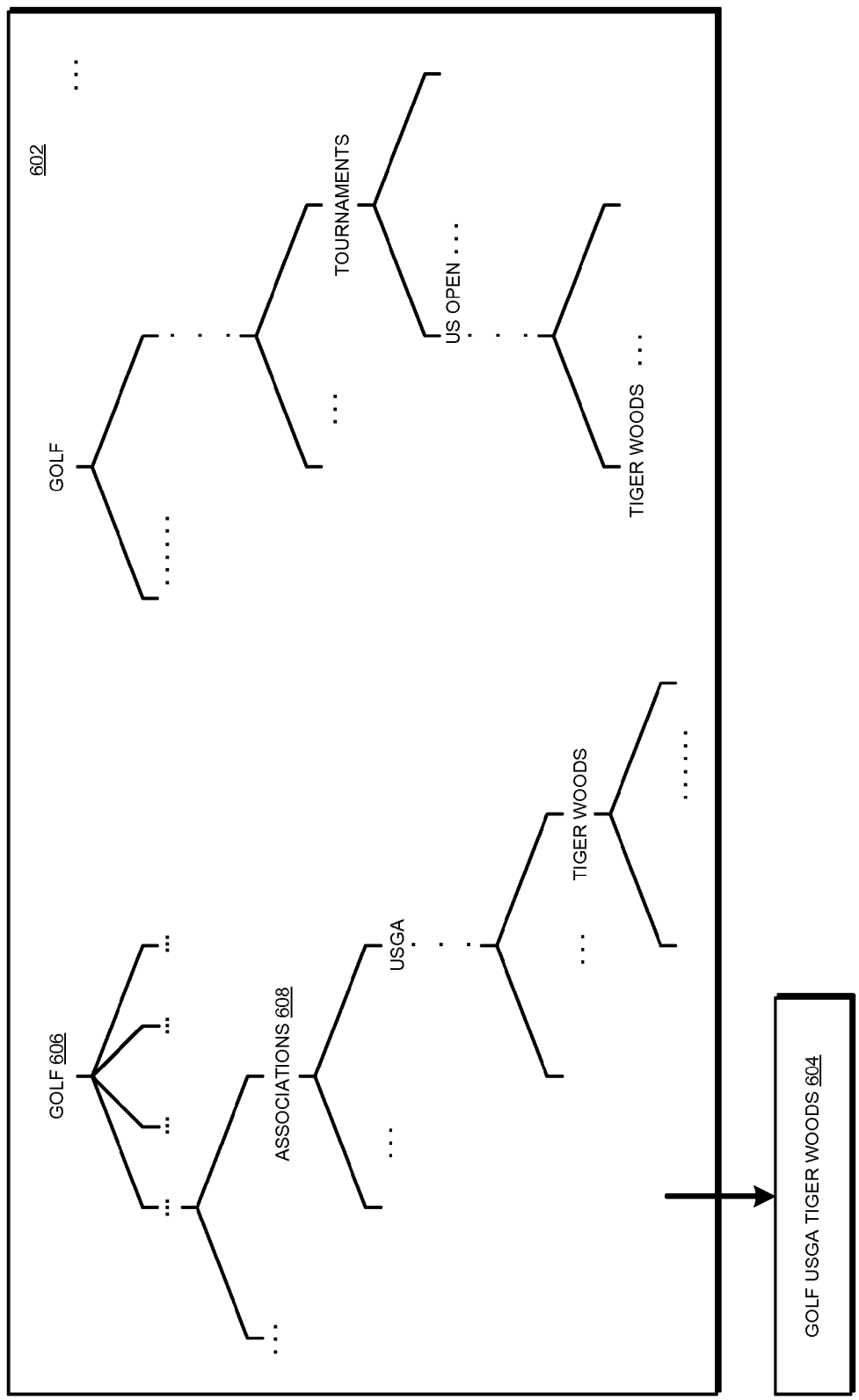
FIG. 6 depicts an example configuration of a domain topology in accordance with an illustrative embodiment.

With reference to FIG. 6, this figure depicts an example configuration of a domain topology in accordance with an illustrative embodiment. Seed 604 created from domain topology 602 is usable as seed 306 in FIG. 3.

Topology 602 includes any number of tree structures as described elsewhere in this disclosure. For example, topology 602 pertains to the subject matter domain of golf. An example tree begins at root node 606 that contains the text "golf." At some level in the example tree, node 608 forms a sub-tree within which the information pertains to golfing associations. A child node of node 608 contains the acronym "USAGE." (USGA is a registered trademark of United States Golf Association in the United States.) At some level under the USGA node, a set of children nodes contain the names of athletes who are associated with USGA in some manner. Node containing "Tiger Woods" is one such node. Nodes may exist below the "Tiger Woods" node and may contain specifics about that athlete.

Using the example tree, seed 604 can be created by a person or application. In one embodiment, application 402 of FIG. 4 also includes or uses (not shown) a component for seed construction to construct seeds such as seed 604. In the depicted example, seed 604 comprises information existing at certain nodes, such as "golf usga tiger woods," as extracted from those respective nodes in the depiction. A seed can be constructed with any number and ordering of nodes from a tree in a given topology in a similar manner without limitation. In one embodiment, a variant of the information existing at a node in a given tree in a given topology can be used in constructing a seed within the scope of the illustrative embodiments.

Figure 7:
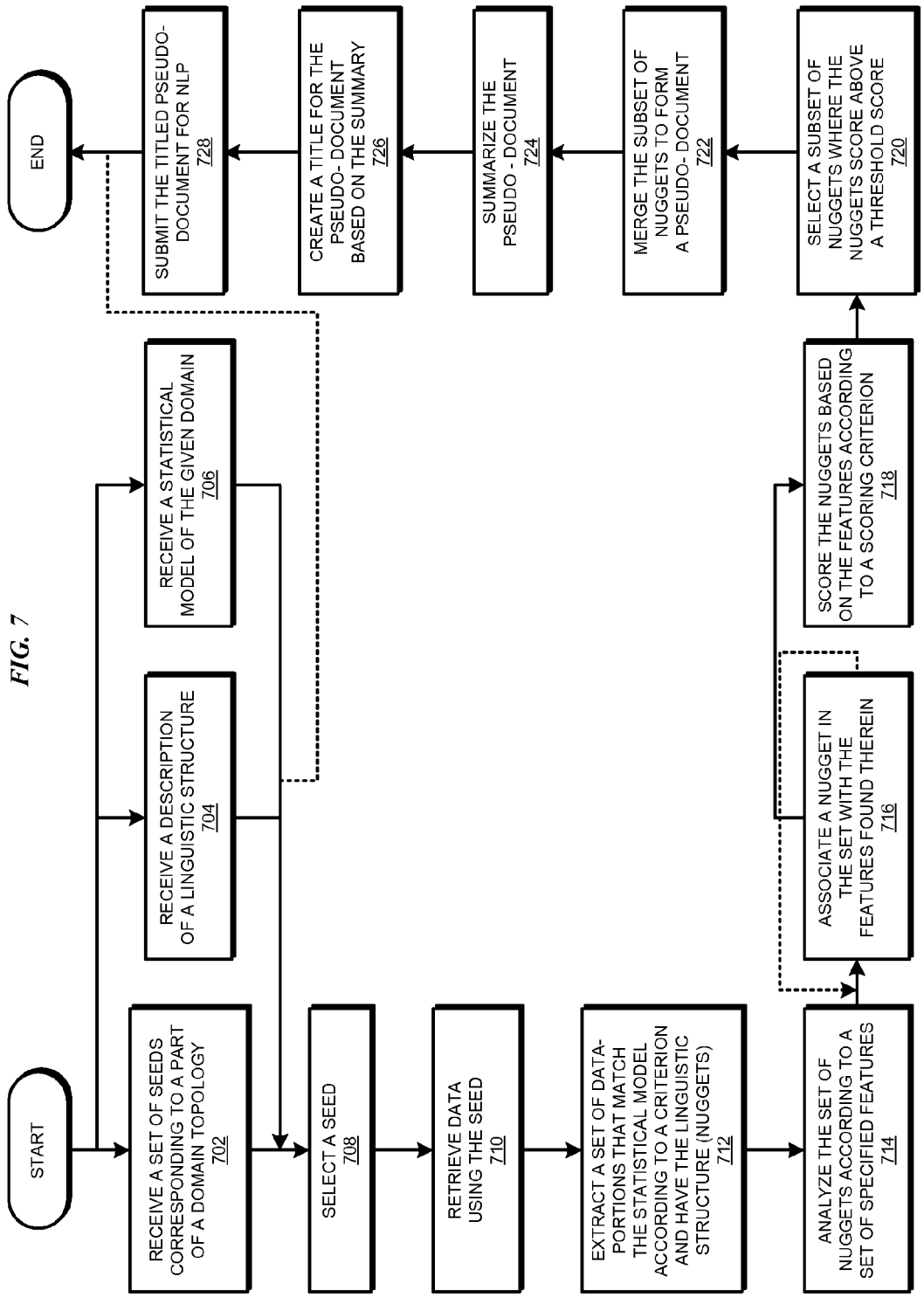
FIG. 7 depicts a flowchart of an example process for compressing data for natural language processing in accordance with an illustrative embodiment.

With reference to FIG. 7, this figure depicts a flowchart of an example process for compressing data for natural language processing in accordance with an illustrative embodiment. Process 700 can be implemented in application 402 in FIG. 4.

An application implementing an embodiment, such as application 402 in FIG. 4, begins process 700 by receiving as inputs a set of seeds corresponding to a part of a domain topology (block 702). The application also receives a description of a linguistic structure, such as in a linguistic model or a portion thereof (block 704). The application receives a statistical model of the given domain (block 706).

The application selects a seed from the set of seeds (block 708). The application retrieves data using the seed or a part thereof (block 710). In one embodiment, the data retrieved in block 710 is expanded or transformed (not shown) into a corpus and the corpus is used in the remainder of process 700 in place of the retrieved data where use of the data is indicated.

The application extracts a set of data portions that match the statistical model according to a criterion and that has, or conforms to, the linguistic structure (block 712). A data portion extracted in this manner is a nugget as described herein.

The application analyzes the set of nuggets to identify a feature from a set of specified features in the nuggets (block 714). The application associates a nugget with a feature found therein (block 716). In one embodiment, the application repeats block 716 for each nuggets in the set of nuggets.

The application scores the nuggets in the set of nuggets based on the features found therein, using a scoring criterion (block 718). The application selects a subset of the scored nuggets where the scores of the selected nuggets exceeds a threshold score (block 720).

The application merges the scored and selected nuggets to form a pseudo-document (block 722). In one embodiment, process 700 ends thereafter.

In another embodiment, the application further proceeds to summarize the contents of the pseudo-document (block 724). The application creates a title for the pseudo-document based on the summary (block 726). The application submits the titled pseudo-document for NLP or other use (block 728). Process 700 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for compressing data for natural language processing. An embodiment processes domain-related data for NLP and other uses such that the processed data is compressed into a smaller volume as compared to a prior art corpus. An embodiment repeats a set of operations described herein to improve a result obtained from using the compressed data. The repetitions can be stopped when a desired level of acceptability is achieved in the results. The repetitions can be resumed when new or changed data related to the domain becomes available from a data source.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for compressing domain-related data, the method comprising:
retrieving data pertaining to a subject matter domain, forming the domain-related data;
receiving, forming a set of seeds, a set of text strings, wherein a text string forms a seed, and wherein the seed is derived from a domain topology;
receiving a description of a linguistic structure present in a language of the domain-related data;

receiving a statistical model applicable to the domain-related data;

extracting, using a processor and a memory, a set of portions of the domain-related data, a portion in the set of portions forming a nugget, and the set of portions forming a set of nuggets, wherein a nugget matches the statistical model according to a criterion, and wherein the nugget conforms to the linguistic structure within a threshold degree;

scoring a nugget in the set of nuggets according to a subset of a set of features found in the nuggets;

selecting a subset of nuggets, the subset including the scored nugget, wherein a score of each nugget included in the subset of nuggets exceeds a score threshold;

combining the subset of nuggets to form a pseudo-document; and submitting the pseudo-document to an application for answering a question related to the domain.

2. The method of claim 1, further comprising:

analyzing the nugget to determine a presence of a feature in the nugget, wherein the feature is a member of a set of features specified for the domain, and wherein the set of features are based on a set of questions to be answered using the domain-related data.

3. The method of claim 2, further comprising:

adjusting the set of features to achieve a different result in using the pseudo-document.

4. The method of claim 1, further comprising:

receiving the score threshold; and adjusting one of (i) the criterion, (ii) the threshold degree, and (iii) the score threshold, to achieve a different result in using the pseudo-document.

5. The method of claim 1, further comprising:

providing a result of answering the question as a feedback to select a different set of nuggets to improve the answering.

6. The method of claim 1, wherein the statistical model provides a frequency of a semantic redundancy of a portion of the domain-related data.

7. The method of claim 1, wherein the statistical model provides a frequency of a lexical redundancy of a portion of the domain-related data.

8. The method of claim 1, wherein the linguistic structure is an organization in which a portion of the domain-related data is presented to provide a correct meaning of the portion according to a grammar of the language.

9. The method of claim 1, wherein the domain topology includes a tree structure comprising a plurality of nodes in parent-child relationships beginning at a root node, and wherein the seed comprises contents of a subset of nodes.

10. The method of claim 1, wherein the data comprises transformations applied to an original data from a data source such that the transformations cause the data to be of a size greater than the original data, and wherein the transformations make the data suitable for use as a corpus in natural language processing (NLP).

11. A computer program product comprising one or more computer-readable tangible storage devices and computer-readable program instructions which are stored on the one or more storage devices and when executed by one or more processors, perform the method of claim 1.

12. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

13. A computer program product for compressing domain-related data, the computer program product comprising:

one or more computer-readable tangible storage devices;

program instructions, stored on at least one of the one or more storage devices, to retrieve data pertaining to a subject matter domain, forming the domain-related data;

program instructions, stored on at least one of the one or more storage devices, to receive, forming a set of seeds, a set of text strings, wherein a text string forms a seed, and wherein the seed is derived from a domain topology;

program instructions, stored on at least one of the one or more storage devices, to receive a description of a linguistic structure present in a language of the domain-related data;

program instructions, stored on at least one of the one or more storage devices, to receive a statistical model applicable to the domain-related data;

program instructions, stored on at least one of the one or more storage devices, to extract, using a processor and a memory, a set of portions of the domain-related data, a portion in the set of portions forming a nugget, and the set of portions forming a set of nuggets, wherein a nugget matches the statistical model according to a criterion, and wherein the nugget conforms to the linguistic structure within a threshold degree;

program instructions, stored on at least one of the one or more storage devices, to score a nugget in the set of nuggets according to a subset of a set of features found in the nuggets;

program instructions, stored on at least one of the one or more storage devices, to select a subset of nuggets, the subset including the scored nugget, wherein a score of each nugget included in the subset of nuggets exceeds a score threshold;

program instructions, stored on at least one of the one or more storage devices, to combine the subset of nuggets to form a pseudo-document; and program instructions, stored on at least one of the one or more storage devices, to submit the pseudo-document to an application for answering a question related to the domain.

14. The computer program product of claim 13, further comprising:

program instructions, stored on at least one of the one or more storage devices, to analyze the nugget to determine a presence of a feature in the nugget, wherein the feature is a member of a set of features specified for the domain, and wherein the set of features are based on a set of questions to be answered using the domain-related data.

15. The computer program product of claim 14, further comprising:

program instructions, stored on at least one of the one or more storage devices, to adjust the set of features to achieve a different result in using the pseudo-document.

16. The computer program product of claim 13, further comprising:

program instructions, stored on at least one of the one or more storage devices, to receive the score threshold; and program instructions, stored on at least one of the one or more storage devices, to adjust one of (i) the criterion, (ii) the threshold degree, and (iii) the score threshold, to achieve a different result in using the pseudo-document.

17. The computer program product of claim 13, further comprising:

program instructions, stored on at least one of the one or more storage devices, to provide a result of answering the question as a feedback to select a different set of nuggets to improve the answering.

18. The computer program product of claim 13, wherein the statistical model provides a frequency of a semantic redundancy of a portion of the domain-related data.

19. The computer program product of claim 13, wherein the statistical model provides a frequency of a lexical redundancy of a portion of the domain-related data.

20. A computer system for compressing domain-related data, the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to retrieve data pertaining to a subject matter domain, forming the domain-related data;

program instructions, stored on at least one of the one or more storage devices for execution by at least one of the one or more processors via at least one of the one or more memories, to receive, forming a set of seeds, a set of text strings, wherein a text string forms a seed, and wherein the seed is derived from a domain topology;

program instructions, stored on at least one of the one or more storage devices for execution by at least one of the one or more processors via at least one of the one or more memories, to receive a description of a linguistic structure present in a language of the domain-related data;

program instructions, stored on at least one of the one or more storage devices for execution by at least one of the one or more processors via at least one of the one or more memories, to receive a statistical model applicable to the domain-related data;

program instructions, stored on at least one of the one or more storage devices for execution by at least one of the one or more processors via at least one of the one or more memories, to extract, using a processor and a memory, a set of portions of the domain-related data, a portion in the set of portions forming a nugget, and the set of portions forming a set of nuggets, wherein a nugget matches the statistical model according to a criterion, and wherein the nugget conforms to the linguistic structure within a threshold degree;

program instructions, stored on at least one of the one or more storage devices for execution by at least one of the one or more processors via at least one of the one or more memories, to score a nugget in the set of nuggets according to a subset of a set of features found in the nuggets;

program instructions, stored on at least one of the one or more storage devices for execution by at least one of the one or more processors via at least one of the one or more memories, to select a subset of nuggets, the subset including the scored nugget, wherein a score of each nugget included in the subset of nuggets exceeds a score threshold;

program instructions, stored on at least one of the one or more storage devices for execution by at least one of the one or more processors via at least one of the one or more memories, to combine the subset of nuggets to form a pseudo-document; and program instructions, stored on at least one of the one or more storage devices for execution by at least one of the one or more processors via at least one of the one or more memories, to submit the pseudo-document to an application for answering a question related to the domain.

* * * * *